April 9, 1963 D. E. WILCOX ET AL 3,084,558
CAPACITANCE PICKOFF WITH LOW COERCION
Filed Nov. 28, 1958 2 Sheets-Sheet 1

INVENTORS.
DOYLE E. WILCOX
ADRIAN J. ROBINSON
BY
ATTORNEY

United States Patent Office
3,084,558
Patented Apr. 9, 1963

3,084,558
CAPACITANCE PICKOFF WITH LOW COERCION
Doyle E. Wilcox, Puente, and Adrian J. Robinson, Southgate, Calif., assignors to North American Aviation, Inc.
Filed Nov. 28, 1958, Ser. No. 777,057
3 Claims. (Cl. 73—517)

This invention relates to sensing devices, and particularly to an improvement in pickup means associated with accelerometers and the like.

In the art of inertial guidance, acceleration-sensitive means are utilized in order to obtain the various values such as acceleration, velocity and distance necessary to compute the course that a device is following, and to predict therefrom the corrections which must be supplied to direct the device on its desired course.

In the design of inertial guidance components such as accelerometers, velocity and distance meters, a sensitive pickoff is commonly employed to measure acceleration by detecting extremely small displacements of a proof mass or pendulous element with respect to a support fixed relative to the carrying device of which the acceleration is to be measured. The output of the pickoff is fed to a servo control circuit which acts on the proof mass or pendulum to restore it to null position. The restoring output of the servo control circuit is then a measure of the acceleration of the carrying device and may be integrated once to give velocity or twice to give distance traveled.

In order to achieve the precision required in inertial guidance, the pickoff, in addition to providing the necessary sensitivity and resolution, should exert negligible coercive influence on the moving element through direct interaction. Many previously used pickoffs of both capacitive and moving-coil magnetic types have required flexible wire leads between the moving element and the case. These wire leads exert mechanical coercive force on the moving element, or proof mass, which cannot be neglected. There may be a coercive force due to the electrostatic force between capacitance elements. Some types of moving magnet arrangement have required that magnetic material be placed on the moving element, and this, too, has undesirable effects.

It is a primary object of this invention to eliminate the mechanical coercive forces by providing means other than wire connections between the sensing element and the case or the magnetic material and the moving element.

A further object is to reduce to substantially zero coercive force on the proof mass due to electrical or magnetic interaction.

Another object of the invention is to simplify the construction of inertial guidance components of the accelerometer type.

A still further object is to provide a sensing element which is responsive primarily to accelerations along a desired axis.

These and other objects will appear from a detailed consideration of the accompanying drawings in which.

Figure 1:
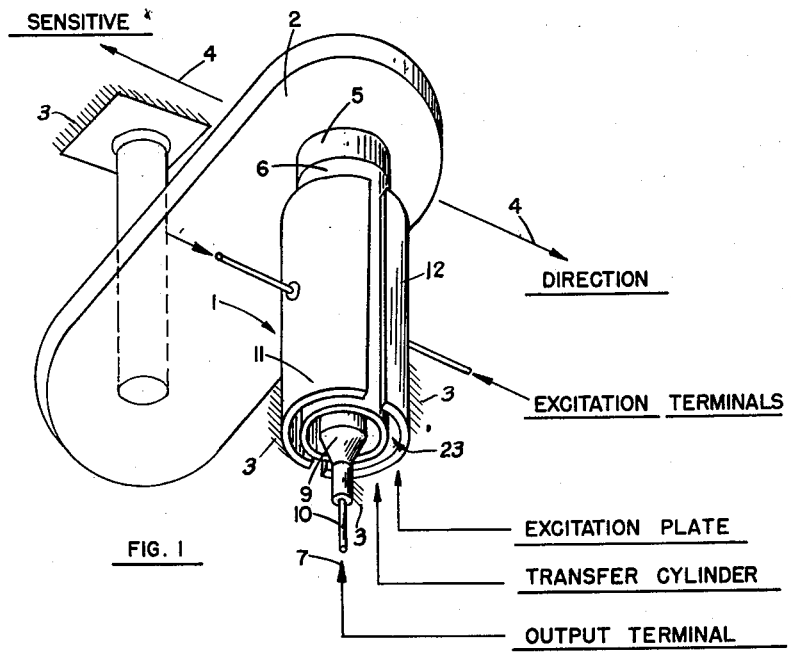
FIG. 1 is a perspective view of a sensing element incorporating the invention applied to a pendulous accelerometer proof mass.

The preferred embodiment of the invention, as shown in FIG. 1 utilizes a pickup or sensing unit, indicated generally as 1, associated with a pendulous proof mass 2, shown fragmentarily. Proof mass 2 forms the sensitive element of an accelerometer or the like, not shown in the figures. It will be understood that this proof mass is arranged for movement in a sensitive direction indicated by the arrows 4. The proof mass is made pendulous, as is well known in the art, by means of a limited pivotal mounting to a supporting structure 3. Fixed to the proof mass 2 is an insulating member 5, to which is secured a cylindrical transfer cylinder 6. At the null position of the proof mass 2, a null axis 7 is defined coaxially with the transfer cylinder 6. Within that cylinder and coaxially with the null position thereof is disposed an output electrode 9 which is attached to the supporting structure 3 and has an electrical output lead 10. A servo controller is arranged to restore the proof mass 2 to null position whenever it is displaced therefrom, utilizing conventional means for this purpose.

Also fixed to the supporting structure 3, but coaxially about the transfer cylinder 6, are two semi-cylindrical excitation plates 11 and 12. Plates 11 and 12 are connected to the opposite secondary end terminals 14 and 15 of an excitation transformer 16 having a center tap 17 disposed electrically midway between terminals 14 and 15. Transformer 16 also has a primary winding 19 which is fed from a suitable alternating-current source through primary terminals 20 and 21. It will be apparent that when an exciting current is applied through primary 19, alternating potentials will be set up on the excitation plates 11 and 12, and that if a connection is made between the center tap 17 and the output terminal 9 through lead 10 to an impedance coupling circuit 22, the amplitude of the signals in the latter may be controlled by the displacement of the transfer cylinder relative to the excitation plates. If the proof mass and transfer cylinder are displaced toward one of the excitation plates 11 or 12, the output from the portion of the circuit including that plate will reflect the change in the capacitance resulting from the approach of the transfer cylinder thereto. This capacitance change will result in a differential change in the amplitude of the output, and will be readily detectable by the servo controller 24 after passing through the impedance coupling circuit 22. The effect of the cylindrical transfer electrode 6 may also be understood as the summing of the electrical field potentials created in the electric field space 23 within the excitation plates or electrodes 11 and 12. The potentials so summed are then transferred to the output electrode 9 by capacitive coupling without requiring direct connections of any sort. This eliminates the undesired coercive effects and results in greater accuracy.

The impedance of the capacitive sensing unit is relatively high, so that the coupling circuit 22 must be used to match its impedance to that of the servo controller circuit or else a negative coercion effect will be developed having the same order of magnitude as the minimum acceleration forces to be measured. This disadvantage may be avoided by presenting to the pickup a coupling circuit impedance of at least twice the sensing unit impedance.

Figure 2:
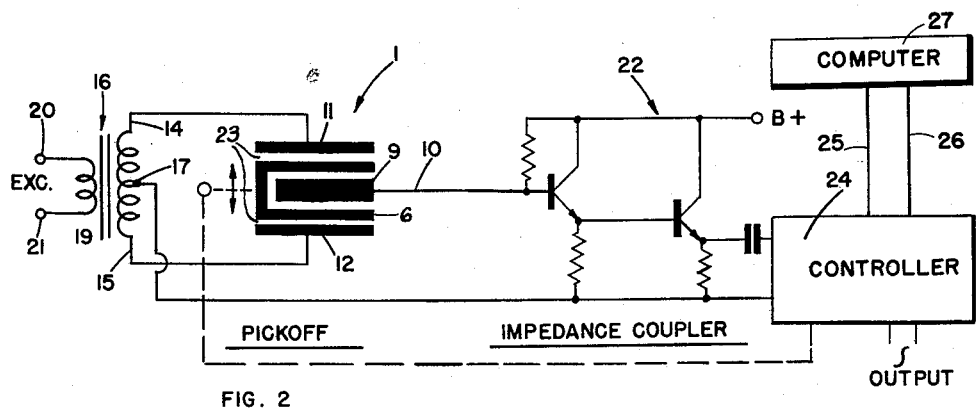
FIG. 2 is a schematic circuit diagram illustrating a preferred arrangement for connecting the sensing element to the servo circuit.

Two-stage transistor circuit for this purpose is illustrated at 22 in FIG. 2, and will couple the servo-controller 24 to the pickup unit 1 without exerting an undesirable coercive force on the latter in the nature of a negative spring rate.

The servo controller 24 will then act to restore the proof mass to its null position, which will again equalize the outputs on the two transformer sections. Suitable conventional means, not shown, may be connected to the controller output terminals 25 and 26 for measuring the displacement required to restore the transfer cylinder to its null position, and this measured quantity will be used, as is well understood by those in the art, to provide a measure of the acceleration experienced and to provide quantities which may be utilized elsewhere in the system to register the acceleration and to compute therefrom parameters necessary for the guidance system and related uses in means such as a computer 27.

Figure 3:
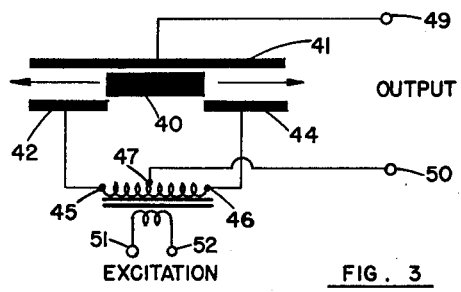
FIG. 3 is a fragmentary schematic circuit diagram illustrating an alternative construction for the sensing element.

An alternative embodiment of the pickup element is shown in FIG. 3. A proof mass having attached thereto or formed integrally therewith a first capacitive coupling plate 40 is shown mounted for linear movement along and parallel to the first planar capacitive sensing plate 41. Opposite plate 41 and parallel thereto is disposed a pair of planar capacitive sensing plates 42 and 44 which are connected to the end terminals 45 and 46 of a secondary transformer having a center tap 47. In this embodiment, the proof mass and coupling plate 40 is displaced linearly by accelerations parallel to the sensing plates and thereby effects changes in the capacitance between the sensing plate 41 and the opposed and electrically separated sensing plates 42 and 44. Output terminals 49 and 50 connected to plate 41 and transformer center tap 47, respectively, deliver an output to circuitry connected thereto, not shown, which will have the same effect when the transformer is excited through primary terminals 51 and 52 as was obtained at the output connections 10 and 17 in the circuit shown in FIG. 2. An impedance coupling circuit will, of course, be used to couple the output terminals 49 and 50 to a similar servo-controller 24 and to a computer 27 for performing the necessary calculations.

Figure 4:
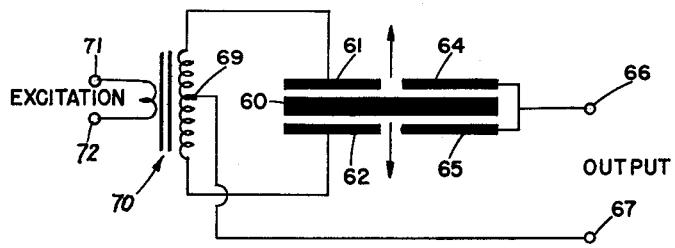
FIG. 4 is another preferred alternative embodiment of the invention.

Still another embodiment of the principle of utilizing a member attached to the proof mass to change the capacitive coupling differentially is seen in FIG. 4 in which the combined transfer electrode and proof mass 60 is moved between opposed planar excitation plates 61 and 62 in a direction normal to the plane thereof, and is simultaneously moved in the same amount and direction between two output plates 64 and 65 which are disposed in coplanar fashion with plates 61 and 62 respectively, but are electrically connected together to a common output terminal 66. Output terminal 66 together with a transformer midpoint output terminal 67 connected to the secondary center tap 69 of the excitation transformer 70 is effective to control the servo circuit, not shown, and to supply proportional data to the associated circuitry, when appropriate potentials are applied to excitation terminals 71 and 72.

Figure 5:
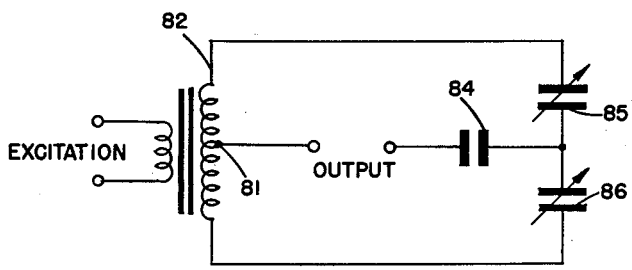
FIG. 5 is a schematic circuit diagram illustrating the basic circuit relations involved in the embodiments of FIG. 1 to 4.

A schematic equivalent bridge circuit is shown in FIG. 5 to illustrate the effective operation of the circuits shown in FIGS. 2 to 4 inclusive. In each of these circuits, the output is taken from the center tap 81 of the transformer secondary indicated generally as 82, and from the common capacitively effective element indicated schematically at 84, which is coupled to the common connection between the two variable capacitances 85 and 86 effectively constituted by the fixed plate elements and the element movable in response to inertial forces.

Although the invention has been described and illustrated in detail, it is to be clearly understood that the same is by way of illustration and example only and is not to be taken by way of limitation, the spirit and scope of this invention being applicable to a variety of other embodiments.

We claim:
1. The combination in a system for measuring accelerations, of: a supporting structure fixed to the device of which the acceleration is to be measured; a proof mass movably mounted in said supporting structure; a transfer cylinder fixed to said proof mass, but insulated therefrom and adapted for movement with said proof mass in a direction normal to the axis of said cylinder on either side of a null position; an output terminal member disposed within said transfer cylinder coaxially with the null position thereof; separated pickup members disposed symmetrically with respect to said transfer cylinder; means for exciting said pickup members in phase opposition, said means having a center tap output connection; and means connected to said output connection and to said output terminal member adapted to communicate with servo circuit means arranged to supply position restoring forces to said proof mass; and means for utilizing the value of said corrective force as a measure of the acceleration experienced by said proof mass.

2. In an acceleration sensing device, the combination, with a pendulous proof mass having a null position, of: a cylindrical transfer cylinder adapted for movement normal to the axis thereof fixed to but insulated from said proof mass; a pair of half-cylindrical excitation terminals disposed coaxially with and symmetrically about said transfer cylinder when said cylinder is in its null position; an output terminal disposed coaxially within said transfer cylinder; an excitation supply means connected in push-pull to said excitation terminals and having a center tap midway therebetween; impedance coupling circuit means connected to said output terminal and to the said midpoint terminal; a servo circuit connected to said output terminal and to said midpoint terminal and adapted to restore said transfer cylinder to null position; and means for utilizing the output of said servo controller as a measure of the acceleration experienced by said proof mass.

3. In combination with a supporting structure an acceleration-sensing device comprising: servo-controlling means; a proof mass arranged for movement along a single translational axis and having capacitively-effective means associated therewith; said capacitively effective means extending in a plane normal to the said translational axis and being operatively linked to said servo-controlling means; excitation plates extending parallel to and spaced from said capacitively effective means; push-pull circuit means for exciting said excitation plates in phase opposition and having a mid-point; and output connection disposed at said mid-point; means comprising a pair of parallel spaced planar electrodes disposed in sensing relation to said capacitively-effective means associated with said proof mass; output connections to said spaced planar electrodes and to said mid-point connection; impedance matching means joining said output connections to said servo-controlling means, whereby said proof mass may be restored, without the exertion of any coercive force thereon, to a null position after any displacement therefrom; computer means for utilizing the magnitudes of restoring actions imparted to said proof mass by said servo-controlling means to initiate directing signals for said supporting structure.

References Cited in the file of this patent

UNITED STATES PATENTS

| | | |
|---|---|---|
| 2,498,997 | McLean et al. | Feb. 28, 1950 |
| 2,797,912 | Trostler | July 2, 1957 |
| 2,802,178 | Shafer et al. | Aug. 6, 1957 |
| 2,840,366 | Wing | June 24, 1958 |